Patented Feb. 24, 1953

2,629,660

UNITED STATES PATENT OFFICE 2,629,660

ANTIFADING BATHS FOR PHOTOGRAPHIC BLACK-AND-WHITE PRINTS

Harold C. Harsh, Binghamton, N. Y., assignor to General Aniline & Film Corporation, New York, N. Y., a corporation of Delaware No Drawing. Application December 1, 1950, Serial No. 198,728

5 Claims. (Cl. 95—88)

This invention relates to photographic black and white negatives and prints, and particularly to anti-fading baths employed in the treatment of black and white photographic taking and printing materials.

Photographic negative and positive prints having a metallic silver image, particularly those negatives and prints characterized by a small particle size of metallic silver, show under certain conditions of storage a propensity to fade, i. e., lose density and change the color of the silver image. This susceptibility is most marked when the negative or print is exposed to an atmosphere containing gaseous products of the oxides of nitrogen, oxides of sulfur, and reactive sulfiding compounds, such as hydrogen sulfide ($H_2S$), and the like, which are frequently encountered in ore smelting, soft coal burning, and artificial gas burning areas.

It is an object of the present invention to eliminate the fading and change of the color of the silver image in black and white negatives and prints upon exposure to the atmosphere.

Other objects and advantages will appear hereinafter.

I have discovered that the above objects are accomplished by treating a photographic black and white material subsequent to exposure and development with a bath of an aqueous solution containing a water soluble addition product obtained by condensing a triazine or a hydantoin with formaldehyde. The triazines (1, 2) and hydantoins (3 and 4), which are condensed with formaldehyde, are characterized by the following formulae:

(1)

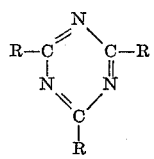

(2)

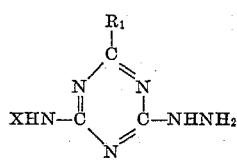

(3)

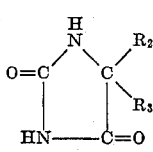

and (4)

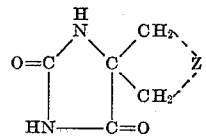

wherein at least one R is an amino group having at least one reactive hydrogen atom, the remaining R's being a radical, such as hydrogen, amino, hydroxy, alkyl, i. e., methyl, ethyl, propyl, isopropyl, butyl, etc., alkylene, i. e., 1-butenyl, etc., aryl, i. e., phenyl, naphthyl, etc., or aralkyl, i. e., benzyl, methylbenzyl, ethylbenzyl, etc., $R_1$ represents hydrazino, hydroxy, phenyl, or an alkoxyalkyl group, e. g., methoxyethyl, ethoxyethyl, propoxyethyl, butoxyethyl, etc., $R_2$ and $R_3$ represent either hydrogen, an alkyl group, i. e., methyl, ethyl, propyl, isopropyl, butyl, etc., allyloxyalkyl or an alkoxyalkyl, i. e., allyloxymethyl, methoxyethyl, ethoxyethyl, propoxyethyl, butoxyethyl, etc., X represents hydrogen or a primary amino group, and Z represents the divalent methylene radicals necessary to complete a 5- or 6-membered cycloaliphatic group, such as cyclopentyl or cyclohexyl.

The addition products of formaldehyde and a triazine characterized by Formula 1 are prepared according to the methods described in United States Patent 2,197,357, those of Formula 2 according to the methods described in United States Patent 2,211,709, and those of Formulae 3 and 4 according to the process described in United States Patent 2,155,863. All of these patents disclose examples of such addition products contemplated herein.

The following are illustrative examples of hydantoins characterized by general Formulae 3 and 4 which may be condensed with formaldehyde according to the process steps described in United States Patent 2,155,863:

Hydantoin
5-methylhydantoin
5-ethylhydantoin
5-propylhydantoin
5,5-dimethylhydantoin
5,5-diethylhydantoin
5,5-cyclohexylhydantoin
5-methyl-5-isopropylhydantoin
5-ethyl-5-isobutylhydantoin
5-methyl-5-ethylhydantoin
5-ethyl-5-isoamylhydantoin
5-methyl-5-ethoxyethylhydantoin
5-(1-sec.-butoxyethyl)-5-butylhydantoin
5-(1-sec.-butoxyethyl)-5-ethylhydantoin 5-(1-sec.-butoxyethyl)-5-isoamylhydantoin
5-(1-sec.-butoxyethyl)-5-isobutylhydantoin
5-(1-sec.-butoxyethyl)-5-isopropylhydantoin
5-(1-sec.-butoxyethyl)-5-methylhydantoin
5-(1-sec.-butoxyethyl)-5-propylhydantoin
5-amyl-5-(1-sec.-butoxyethyl)-hydantoin
5,5-bis(hexyloxymethyl) hydantoin
5,5-bis(isoamoxymethyl) hydantoin
5,5-bis(isobutoxymethyl) hydantoin
5,5-bis(methoxymethyl) hydantoin
5,5-bis(propoxymethyl) hydantoin
5,5-bis(allyloxymethyl) hydantoin
5,5-bis(amoxymethyl) hydantoin
5,5-bis(sec.-butoxymethyl) hydantoin
5,5-bis(ethoxymethyl) hydantoin
5-allyl-5-(cyclohexenyl) hydantoin
5-allyl-5-(1'-cyclohexenyl) hydantoin
5-methyl-5-cyclohexylhydantoin.

By utilizing a bath containing the addition products, the tendency of the developed silver images in black and white negatives, positives, and prints therefrom to fade and change in tone or color upon storage or exposure to an atmosphere containing the aforementioned gases is completely eliminated for an indefinite period of time. The exact operation of the addition product upon the developed silver images is still unknown. It is believed for the sake of temporary explanation that the particles of the addition product protect the silver images from the attack of the aforementioned gases without adversely affecting the silver images.

In preparing the anti-fading baths of the present invention, the addition product is simply dissolved in water and the resulting solution utilized in the treatment of the photographic material subsequent to exposure and development. The concentration of the addition product may vary between 0.5 and 20%. The actual concentration employed will depend upon the type of emulsion used in the photographic black and white material and varies slightly with the type of addition product employed. For practical purposes in the treatment of exposed and developed black and white photographic materials, concentrations ranging between 2 and 10% are most desirable.

To facilitate the penetration of the addition product into the silver halide emulsion layer subsequent to exposure and development, it may be desirable to incorporate a surface active agent, such as the formaldehyde condensation product of naphthalene sulfonic acid sold under the trade-name of Tamol NNO, the sodium sulfonate of hexylsuccinate, the sodium sulfonate of butylnaphthalene, and the like.

The black and white photographic materials which may be treated subsequent to exposure and development are contact printing paper, projection printing paper, ordinary black and white film which may be a positive or negative, and motion picture film.

The following examples will serve to illustrate the methods for accomplishing the above objects but are not to be construed as limiting the invention.

*Example I*

A black and white negative was printed by projection on two 5 x 7 sheets of black and white chlorobromide projection paper. The two exposed sheets were developed for 1 to 2 minutes at 20° C. in a warm-tone developer of the following composition:

| | Grams |
|---|---|
| p-Monomethylaminophenol sulfate | 0.8 |
| Sodium sulfite | 12.0 |
| Hydroquinone | 3.3 |
| Sodium carbonate (monohydrate) | 12.0 |
| Potassium bromide | 1.4 |
| Water to make 1 liter | |

The developed papers were shortstopped for 2 minutes in a shortstop bath of the following composition:

Acetic acid 28% _____ 45 cc.
Water to make 1 liter

The prints were washed for 2 minutes in running water and hardened for 5 minutes in an acid hardening fix of the following composition:

| | | |
|---|---|---|
| Sodium thiosulfate | grams | 240 |
| Sodium sulfite | do | 15 |
| Acetic acid 28% | cubic centimeters | 45 |
| Potassium alum | grams | 15 |
| Water to make 1 liter | | |

In preparing the above fixing solution, the sodium thiosulfate is separately dissolved in a sufficient amount of water and then added to a solution of the remaining ingredients and brought up to volume. After fixing, the prints were washed for 10 minutes in running water at 20° C.

After finally washing, one print was set aside while the other was rinsed for 2 minutes in an aqueous solution containing 5% of trimethylol melamine, available under the brand-name of Tanak MRX, and having the following formula:

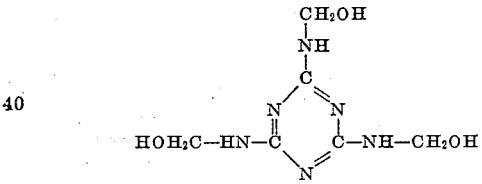

At this point both prints appeared identical, i. e., characterized by a warm image tone. After normal drying and storage in an atmosphere containing the combustion products of an unvented burner utilizing natural gas, the print rinsed in the solution containing the trimethylol melamine showed no fading or change of color in the silver images whereas the untreated print showed considerable fading and change in color.

*Example II*

Example I was repeated with the exception that 5 grams of trimethylolmelamine were replaced by 7 grams of the condensation product of formaldehyde and melamine prepared according to Example 19 of United States Patent 2,197,357. The black and white print washed in plain water and exposed to an atmosphere containing oxides of nitrogen for several days showed considerable fading and change in color of the silver images, whereas the print washed with the aqueous solution containing the condensation product showed no fading or change in color.

*Example III*

Example I was again repeated with the exception that 5 grams of trimethylol melamine were replaced by 8 grams of the condensation product of formaldehyde and 5,5-dimethylhydantoin prepared according to Example I of United States Patent 2,155,863. The results obtained were identical with those in Example I.

The treating baths which I have described and employed may be used in treating various kinds of silver halide emulsions, such as chloride, bromide, chloro-bromide, bromoiodide, or chlorobromoiodide emulsions subsequent to exposure and development. In addition to being useful in treating orthochromatic and panchromatic emulsions, they may also be used in treating non-sensitized emulsions, boil type, and ammonia type emulsions.

Various modifications of this invention will occur to persons skilled in the art and it is, therefore, understood that the patent granted shall only be limited by the appended claims.

I claim:

1. In the process of producing silver images in a silver halide emulsion layer by exposing the emulsion, developing and fixing and washing the same, the improvement which comprises preventing the fading and change in color of the silver images upon exposure to the atmosphere after the washing operation by rinsing the emulsion layer with an aqueous solution containing an addition product of formaldehyde and a compound selected from the class consisting of those having the following formulae:

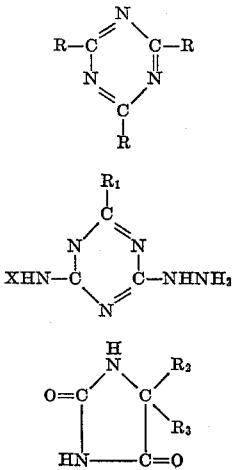

and

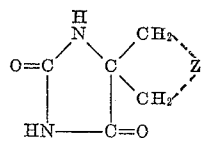

wherein at least one R is an amino group having at least one reactive hydrogen atom, the remaining R's being radicals selected from the group consisting of hydrogen, hydroxy, amino, alkyl, alkylene, aryl, and aralkyl groups, $R_1$ represents a member selected from the class consisting of hydrazino, hydroxy, phenyl, and alkoxyalkyl groups, $R_2$ and $R_3$ represent a member selected from the class consisting of hydrogen, alkyl, allyloxyalkyl, and alkoxyalkyl groups, X represents a member selected from the class consisting of hydrogen and a primary amino group, and Z represents the divalent methylene radicals necessary to complete a member selected from the class consisting of 5- and 6-membered cycloaliphatic groups.

2. The process according to claim 1, wherein the addition product is trimethylol melamine.

3. The process according to claim 1, wherein the addition product is the product of formaldehyde and melamine.

4. The process according to claim 1, wherein the addition product is the product of formaldehyde and 5,5-dimethylhydantoin.

5. The process according to claim 1, wherein the addition product is the product of formaldehyde and hydantoin.

HAROLD C. HARSH.

REFERENCES CITED

The following references are of record in the file of this patent:

UNITED STATES PATENTS

| Number | Name | Date |
|---|---|---|
| 2,363,493 | Baldsiefen | Nov. 28, 1944 |
| 2,487,569 | Mackey | Nov. 8, 1949 |